United States Patent

[11] 3,602,809

[72] Inventors Yasuo Tarui;
 Yutaka Hayashi, both of Tokyo-to, Japan
[21] Appl. No. 831,312
[22] Filed June 9, 1969
[45] Patented Aug. 31, 1971
[73] Assignee Kogyo Gijutsuin (aka as Agency of Industrial Science and Industry, Japanese Government) Tokyo-to, Japan
[32] Priority June 12, 1968
[33] Japan
[31] 43/39,956

[54] HIGH SPEED FUNCTION TESTER FOR INTEGRATED CIRCUITS
 7 Claims, 3 Drawing Figs.
[52] U.S. Cl. .................................................. 324/57 R, 324/73
[51] Int. Cl. .................................................. G01r 27/00
[50] Field of Search .......................................... 324/57, 73, 158

[56] References Cited
UNITED STATES PATENTS
3,182,253  5/1965  Dorsch et al. ............... 324/73 X
3,199,025  8/1965  Stone et al. .................. 324/73

Primary Examiner—Edward E. Kubasiewicz
Attorney—Holman & Stern

ABSTRACT: The test apparatus is composed of a clock signal generating circuit, a patterned pulse generating circuit operated in synchronism with the clock signal generating circuit, with the output of the patterned pulse generating circuit being furnished to an integrated circuit to be tested, a reference voltage generating circuit, a comparator circuit to compare the output pulses from the integrated circuit to be tested with the output from the reference voltage generating circuit, a function pulse generating circuit synchronized with an output from the comparator circuit, a circuit for detecting coincidence between the output from the comparator circuit and the output from the function pulse generating circuit, and a displaying circuit to display the output of the coincidence detecting circuit, whereby the validity of the integrated circuit is determined from the coincidence of the output pulses from the integrated circuit with the expected pulse patterns obtained from the function pulse generating circuit.

3,602,809

HIGH SPEED FUNCTION TESTER FOR INTEGRATED CIRCUITS

BACKGROUND OF THE INVENTION

This invention relates to electronic test apparatuses, and more particularly to a type thereof which may be employed for functional testing of integrated circuits.

When the scale of integration of an integrated circuit is scale and the function thereof becomes increasingly complicated, all of the functions thereof cannot be tested by the conventional single terminal pulse response testing device. For this reason, there is an urgent demand for a test apparatus which can test functions of an integrated circuit by applying a combination of different pulses simultaneously to a plurality of terminals of the integrated circuit, each having a different function, and by examining the pulse pattern of the output pulses from the integrated circuit and comparing this pattern with that expected in the normal operational condition.

Test apparatuses heretofore utilized for this purpose have employed a gate belonging to the same family as the gate of the integrated circuit to be tested. However, this kind of test apparatuses has had the drawback of requiring replacement of this part of the apparatuses each time an integrated circuit having a different type of gate is tested.

Furthermore, for various types of integrated circuits to be tested, the part of the test apparatus which must be replaced should be prepared, for instance, as a plug-in unit, with such a necessity rendering the test apparatus totally uneconomical.

In addition, when a new type of integrated circuit, for which a replacing unit has not yet been prepared, is to be tested, the test cannot be accomplished until a new plug-in unit corresponding to the new integrated circuit is obtained.

When an integrated circuit is tested at nearly its upper limiting frequency, the plug-in unit including a gate similar to the gate of the integrated circuit is also operated near the limiting frequency, and, for this reason, errors due to the test apparatus itself are included in the test results.

SUMMARY OF THE INVENTION

Therefore, the primary object of the present invention is to provide a novel test apparatus wherein all of the above described drawbacks are substantially eliminated.

Another object of this invention is to provide a novel type of test apparatus wherein the preparation of the plug-in units is made entirely unnecessary.

Still another object of the invention is to provide a test apparatus composed of high-frequency components, whereby the above described upper limit in the high frequency range is completely eliminated.

An additional object of the invention is to provide a novel type of test apparatus which is simple and versatile in its operation and economical in its production.

These and other objects of the present invention can be achieved by a functional test apparatus, according to the present invention, which comprises a clock signal generating circuit, a patterned pulse generating circuit operable in synchronism with the clock signal generating circuit, the output of the patterned pulse generating circuit being furnished to an integrated circuit to be tested, a reference voltage generating circuit, a comparator circuit to compare the output pulses from the integrated circuit to be tested with the output from the reference voltage generating circuit, a function pulse generating circuit synchronized with an output from the comparator circuit, a circuit for detecting coincidence between the output from the comparator circuit and the output from the function pulse generating circuit, and a displaying circuit to display the output of the coincidence detecting circuit, whereby the validity of the integrated circuit is determined from the coincidence of the output pulses from the integrated circuit with the expected pulse patterns obtained from the function pulse generating circuit.

The nature, principle, and utility of the invention will be more fully apparent from the following detailed description with respect to preferred embodiments of the invention when read in conjunction with the accompanying drawings.

DETAILED DESCRIPTION

Figure 1:
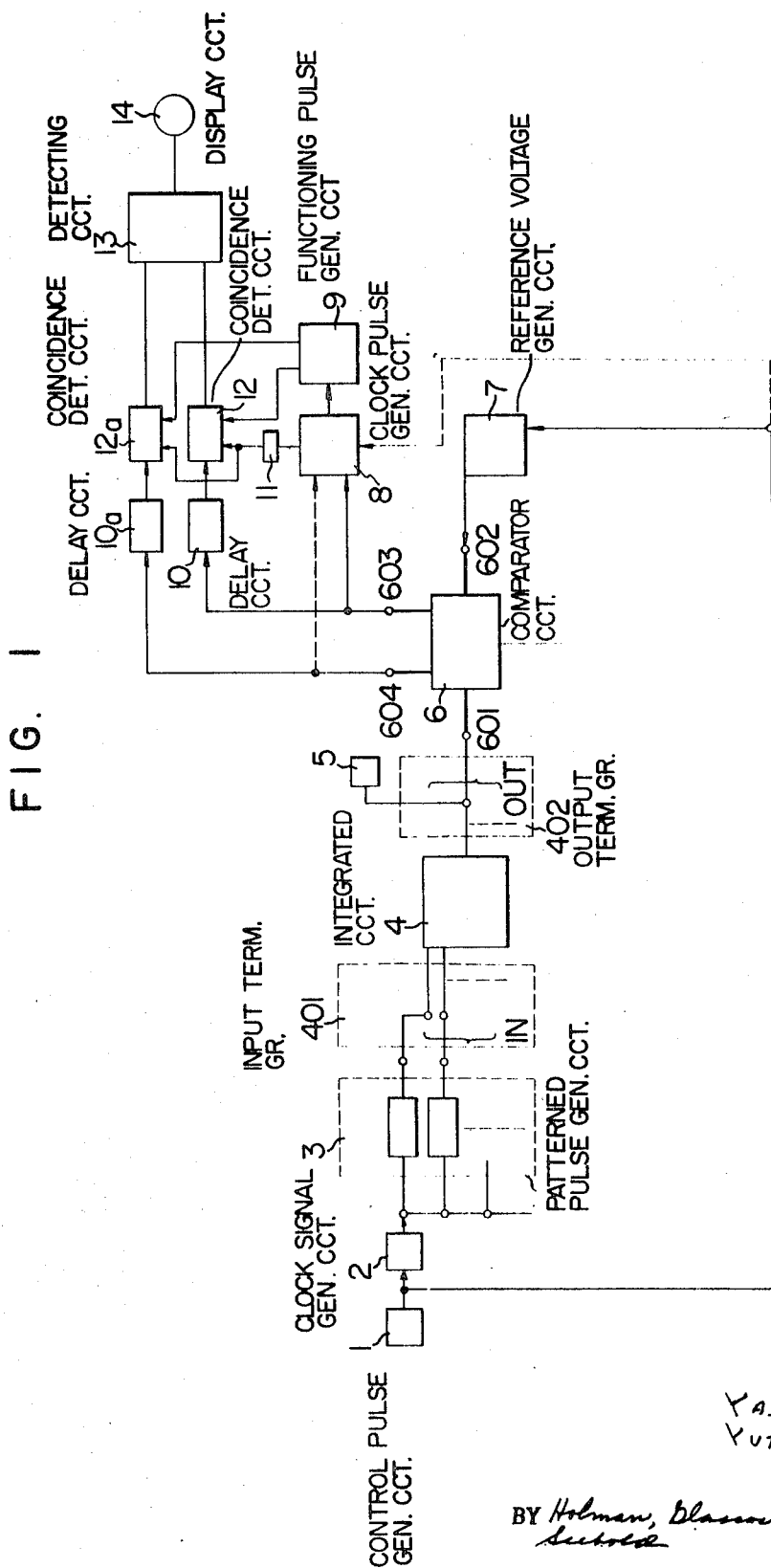
FIG. 1 is a block diagram explanatory of the principle of the present invention.

The principle of the apparatus of this invention and its organization will now be described with reference to FIG. 1 which illustrates, in the form of a block diagram, a control pulse generating circuit 1 for triggering a clock signal generating circuit 2 so that a required number of clock pulses are delivered therefrom. A pattern generating circuit 3 generates pulse patterns in synchronism with the clock pulses, and the shape, the lower level $V_L$ and the higher level $V_H$ of each pulse pattern may be adjusted as desired. A mechanism capable of varying rise time and decay time of the pulse pattern may also be provided in the pattern generating circuit 3.

The output of the circuit 2 drives an input terminal group 401 for an integrated circuit 4 to be measured directly or indirectly through an integrated circuit analogous to the circuit 4 to be measured. From the output terminal group 402 for the measured integrated circuit 4, pulse patterns corresponding to a combination of the driving pulse patterns are obtained. Across a part of the output terminal group 402, a load 5 to be employed, for instance, for fanning-out is connected. Numeral 6 designates a comparator circuit having a large dynamic range and of a type of, for instance, a differential amplifier or a constant current transfer ring type. One of the input terminals (601) of the comparator circuit 6 is supplied with the output pulses from the integrated circuit 4 to be measured, and the other input terminal 602 is supplied with the pulses from a reference voltage generating circuit 7 which may also be triggered by the control pulses from the control pulse generating circuit 1.

When the output voltage from the integrated circuit is higher than the standard voltage from the reference voltage generating circuit 7, a pulse having a suitable amplitude for this system independent of the actual amplitude of the output pulses from the integrated circuit is obtained from the output terminal 603 of the comparator circuit 6. An output from another output terminal 604 of the comparator circuit 6 is complementary to the output from the terminal 603, and this output may be employed for checking erroneous operation of the comparator 6 or other related circuits. The terminal 604 is not essential for the constitution of this invention and, therefore, may be omitted if so desired.

In the case of the output pulses from the terminal 603, the output is partly employed for synchronizing another clock pulse generating circuit 8, and a clock pulse generated therefrom is applied to a function pulse generating circuit 9 and also to a coincidence detecting circuit 12 through an appropriate delay circuit 11.

The function pulse generating circuit 9 thereupon generates a pulse pattern which is expected to be obtained from the output terminal 603 when an input pulse from the pattern generating circuit 3 is applied to the integrated circuit to be tested. The pulse pattern generated from the function pulse generating circuit 9 can be regulated from outside as desired and the regulation may be performed directly by an operator of this test apparatus with reference made to a Function Table or indirectly by the aid of an electronic computer.

It will be assumed that the coincidence detecting circuit 12 consists of a circuit element having similar function as an "exclusive OR" circuit. Then, when the integrated circuit 4 to be measured operates erroneously, there will be no coincidence between the output pulse from the comparator circuit 6 and the output pulse from the function pulse generating circuit 9, and, hence, an output pulse is obtained from the circuit 12, with this output pulse being detected by a detecting circuit 13 and displayed on a display circuit 14. A delay circuit 10 inserted between the output terminal 603, and the input of the coincidence detecting circuit 12 is employed for the alignment of phases of the output pulse from the comparator circuit 6 during normal operation and of the output pulse from the function pulse generating circuit 9.

In order to synchronize the clock pulse generating circuit 8 employing an output from the comparator circuit 6, the sequence of the input pulse series from the clock pulse generating circuit 2 must be so determined that the output from the integrated circuit corresponding to a certain pulse included in the pulse series from the circuit 2 delivers the synchronizing pulse from the comparator circuit 6.

Figure 2:
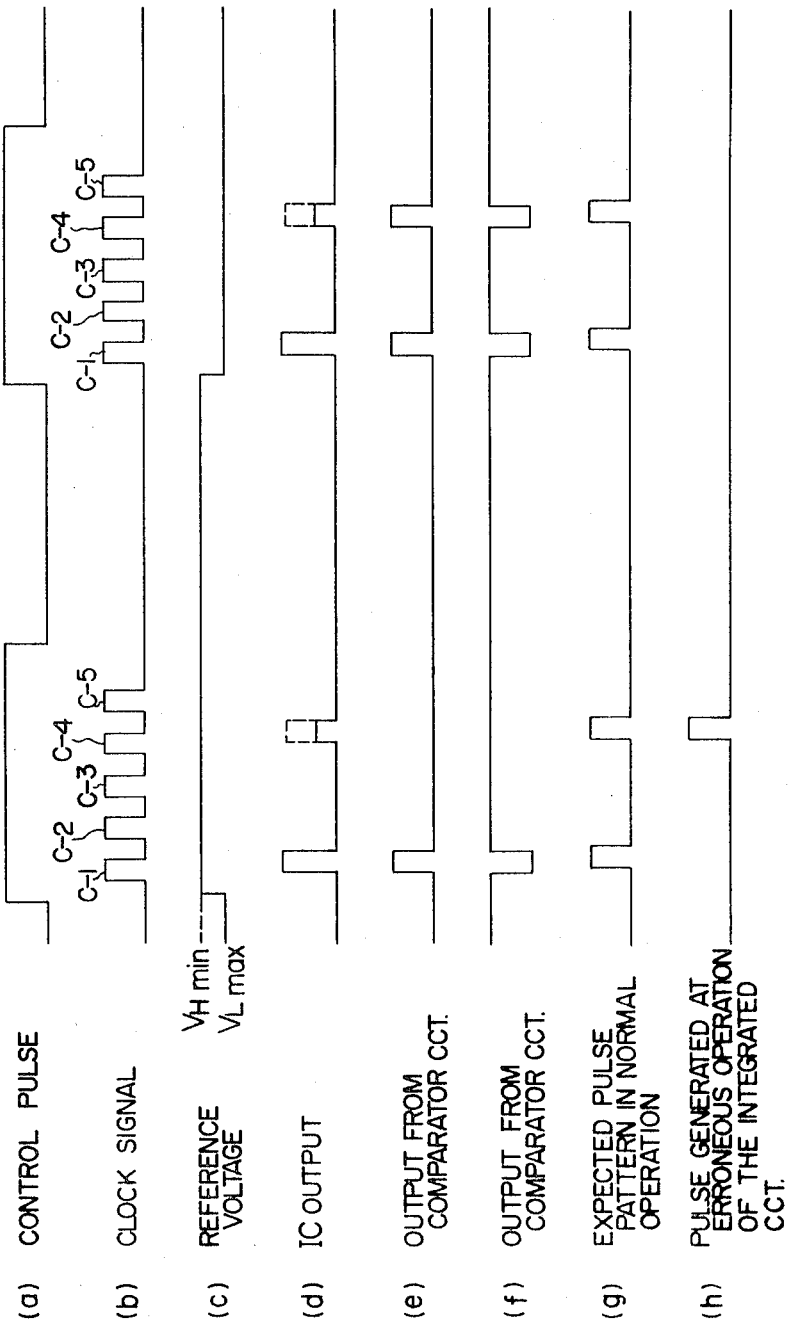
FIG. 2 is a waveform diagram for pulses to be employed for describing the operation of each component of the apparatus according to this invention.

FIG. 2 schematically indicates various pulse forms obtained from important parts of the apparatus. In the figure, (a) is a controlling pulse delivered from the control pulse generating circuit 1, and under the control of this pulse, a series of clock pulse (b) is generated from the clock pulse generating circuit 2. In this example, the clock pulse consists of five element pulses C-1, C-2, C-3, C-4, and C-5, and the number of such element pulses may be determined so that the number of combinations thereof meets the theoretical requirement. (c) is a pulse generated from the reference voltage generating circuit 7 and applied to the input terminal 602 of the comparator circuit 6, and, as is apparent from the pulse form, the pulse is switched between the maximum value $V_{Hmin}$ and the minimum value $V_{Lmax}$ specified for the output voltage from the integrated circuit 4 to be tested. In this case, if the output voltage from the integrated circuit 4 corresponding to, for instance, the element pulse C-4 is not of sufficient value as shown in (d), the output pulse from the comparator circuit 6 will be as shown in (e). It should be noted that such comparison of the output voltage with the maximum specified value $V_{Hmin}$ is not accomplished at the right-hand side of the diagram where the comparison is performed with the minimum specified value $V_{Lmax}$. The output pulse from the comparison circuit 6 and the expected pulse pattern (f) generated from the function pulse generating circuit 9 are applied to the coincidence detecting circuit 12. Since the output from the integrated circuit corresponding to the element pulse C-4 does not coincide with the corresponding part of the function pulse a pulse indicated by (h) is delivered from the coincidence detecting circuit 12 for reporting the existence of an insufficient output voltage of the integrated circuit at a position corresponding to the element pulse C-4. It is to be observed that the control pulse generating circuit 1 is not essential in the constitution of the invention and may be eliminated without departing from the scope of the invention.

It should also be noted that the repetition frequencies of the clock signal generating circuit 2 and the clock pulse generating circuit 8 must coincide with high precision. However, a part of the output from the clock signal generating circuit 2 may also be employed instead of the clock pulse generating circuit 8, and the phase of that part of the output may be adjusted through a suitable phase adjusting circuit.

As was described already, the comparator circuit 6 may have another output terminal 604, and an output complementary to that from the terminal 603, which is illustrated in (f), may be obtained from the terminal 604. Such a complementary output may then be furnished to another coincidence determining circuit 12a through another delay circuit 10a, and the output from the another coincidence determining circuit 12a may also be furnished to the above-described detecting circuit 13 for checking erroneous operation of the testing apparatus.

Figure 3:
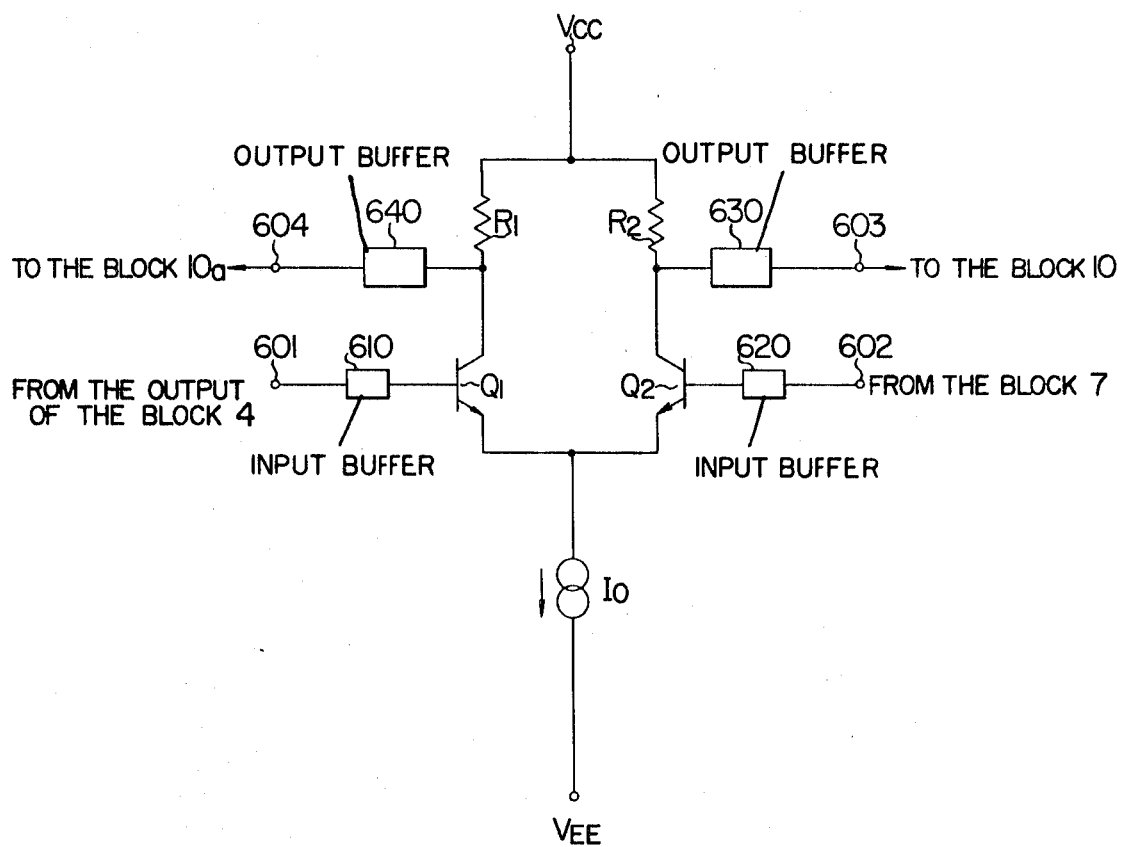
FIG. 3 is a diagram showing schematically a comparator circuit of differential amplifier type or a current transfer type which constitutes one embodiment of a part of the apparatus according to the invention.

The comparison circuit 6 itself may be constructed into a differential amplifier type or a constant current transferring type both including two transistors Q1 and Q2 and a constant current bias Io as shown in FIG. 3. In such a construction of the comparison circuit 6, if the voltages $V_{CC}$ and $V_{EE}$ are selected with sufficient margins against expected output levels from the integrated circuit to be tested, there is no necessity of replacing the comparison circuit even though the value of the reference voltage applied at the terminal 602 is varied in correspondence with the kind of the integrated circuit to be tested. Furthermore, if the constant current biasing source Io and resistances R1 and R2 are suitably determined, an output pulse of sufficient amplitude to be applied to a delay circuit 10 or to the coincidence detecting circuit 12 may be obtained from the comparator circuit 6. In addition, this circuit has been considered to be the fastest operable circuit of this kind, and if the transistors of higher frequency type are employed, the measurement up to the highest limiting frequency of the integrated circuit operation is thereby achieved.

In FIG. 3, numerals 610 and 620 designate buffer circuits employed for increasing the input impedances of the comparator circuit 6, and these are employed for preventing disturbance from being imparted to the integrated circuit to be tested, although such circuits are not essential for the constitution of the present invention. For simplification of these circuits, an emitter follower circuit of bipolar transistors or field effect transistors having a constant current bias may be employed. Numerals 630 and 640 are buffer or signal level converters to be employed for transmitting signals from be comparator circuit 6 to the subsequent stages.

As is apparent from the above description, with the employment of the testing apparatus according to the present invention, there is no necessity of replacing one part of the apparatus each time the kind of the integrated circuit to be tested is altered, and substantially every kind of integrated circuit can be tested by means of a single test apparatus up to the higher limiting frequency of the integrated circuit.

The test apparatus according to the present invention, based on a unique concept, can also be employed more effectively for testing LSI (large-scale integrated circuits), which have been developed recently. In other words, with the employment of this apparatus, the testing of a subsystem composed by the LSI can be advantageously carried out.

We claim:

1. A functional test apparatus for integrated circuits comprising a clock signal generating circuit, a patterned pulse generating circuit operated in synchronism with the clock signal generating circuit so that the outputs of the patterned pulse generating circuit are furnished to an integrated circuit to be tested, a reference voltage generating circuit, a comparator circuit to compare the output pulses from the integrated circuit to be tested with the output from the reference voltage generating circuit, a function pulse generating circuit synchronized to an output from the comparator circuit, a circuit for detecting coincidence between the output from said comparator circuit and the output from the function pulse generating circuit, and a displaying circuit to display said output from the coincidence detecting circuit, whereby the validity in the function of the integrated circuit is determined from the coincidence of the output pulses from the integrated circuit with the expected pulse patterns obtained from the function pulse generating circuit.

2. A test apparatus as defined in claim 1 wherein a control pulse generating circuit is further provided in the preceding stage of the clock signal generating circuit.

3. A test apparatus as defined in claim 1 wherein said patterned pulse generating circuit, output pulses of which are applied to said integrated circuit to be tested, is further provided with pulse pattern adjusting means whereby the rising time and decaying time of the pulses as well as their lower levels and higher levels can be adjusted as desired.

4. A test apparatus as defined in claim 1 wherein said comparator circuit is so arranged that another output complementary to said first output is delivered from said comparator circuit, said other output being thereafter supplied to another coincidence detecting circuit identical to said first coincidence detecting circuit, whereby erroneous operation of the test apparatus can be detected automatically.

5. A test apparatus as defined in claim 1 wherein said coincidence detecting circuit includes an "exclusive OR" circuit.

6. A test apparatus as defined in claim 1 wherein said synchronization of the function pulse generating circuit to an output of the comparator circuit is carried out through provision of a clock pulse generating circuit, said output from the comparator circuit being applied to said clock pulse generating circuit.

7. A test apparatus as defined in claim 1 wherein said synchronization of the function pulse generating circuit to an output of the comparator circuit is carried out through the employment of an output from said clock signal generating circuit.